Jan. 28, 1941.  E. C. TUGGLE  2,229,710
GAUGED SAW SIDE FILE
Filed March 4, 1940
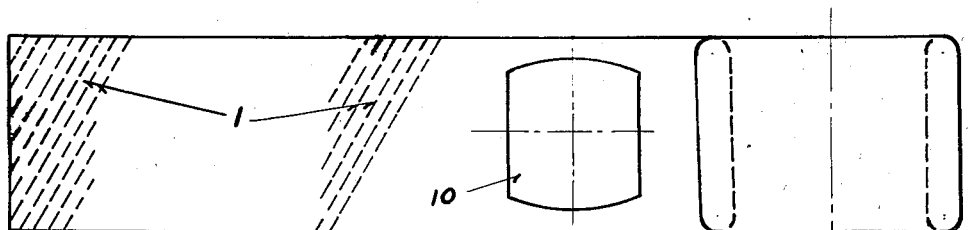
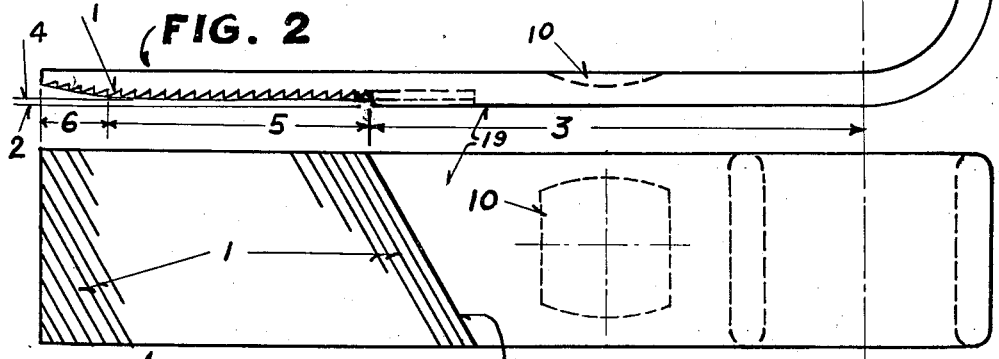
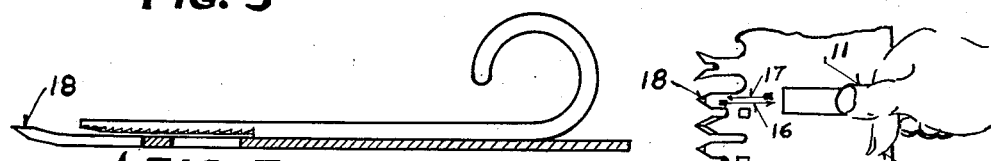
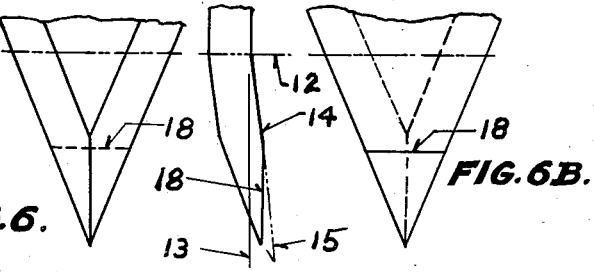
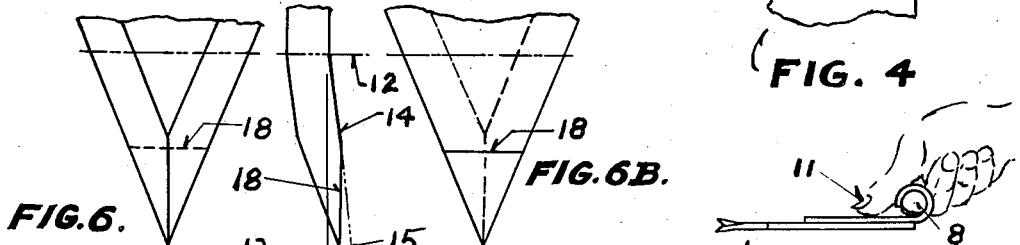
INVENTOR:
Edgar C. Tuggle Patented Jan. 28, 1941

2,229,710

UNITED STATES PATENT OFFICE 2,229,710

GAUGED SAW SIDE FILE

Edgar C. Tuggle, near Mosheim, Tenn.

Application March 4, 1940, Serial No. 322,226

1 Claim. (Cl. 76—47)

This invention relates to a file.

The object of this invention is to provide a gauged file that will shape on the tips of shearing teeth, on the side set away from the edge of the saw, small planes parallel to and slightly off-set from the planes of the sides of the saw—planes that are in alinement in almost microscopic exactness on each side of the saw. This file can be used also to aline inserted teeth of circle saws; a style of file being made for each sort of saw. The very close alinement insured by the proper use of this file causes a saw to saw faster and easier; and causes it to cut a smoother kerf; which kerf, in the case of lumber sawed out by the larger circle saws, insures less waste in planing the lumber down.

This invention will best be understood by considering the following detailed description of it in view of the accompanying drawing, which drawing is to form a part of the specification; nevertheless, it is to be understood that the invention is not to be confined to the disclosure, being susceptible to such changes and modifications as shall define no material departure from the salient features of the invention as expressed in the specification and claim.

In the drawing:

Figure 1 is a longitudinal plan view of a file made in accordance with the principles of my invention. Figure 2 is the elevation, and Figure 3 is the bottom view.

Figures 4 and 5 show how the file is held on the side of the saw when filing. Figure 6, 6a and 6b show in detail how a tooth is side-filed. Figure 7 shows the relative position of the file to the side of the saw blade when the file is in position for filing off the sides of tips, looking from end of blade.

The same number designates the same part in all figures. The number 1 designates teeth on the under side of the file. 19 designates on the bottom of the file a surface that is smooth within the limits of 3. 20 designates the front edge of this surface, and this edge should be slightly rounded or beveled to prevent scarring tips of saw teeth in case it should be pushed over them in the forward stroke. 2 designates a line in a horizontal plane with the plane of 19. 4 designates a line in a horizontal plane with the edges of the teeth within the limits of 5. This plane of the edges of the teeth within the limits of 5 and the plane of 19 must be parallel and slightly separated, the degree of their separation depending on the sort of saw the file is to be made to be used on. The edges of the teeth on the end of the file, as indicated within the limits of 6, may be in plane inclined upward from the plane of the teeth within the limits of 5.

The number 7 designates a partial loop bent on the rear end of the file, to allow a fore-finger to be thrust through to hold the file when using it, as at 8 in Figures 4 and 5. The edges of this loop may be rounded, as indicated at 9, to make grasping it easier on the fore-finger.

The number 10 designates on the top side of the file a depression conforming to the contours of the ball of the thumb, to enable the thumb better to press the file against the side of the saw and hold the file in line with the tooth it is being used on; as indicated at 11 in Figures 4 and 5.

How this file is used to aline the tips of shearing teeth on each side of a saw; or to aline the inserted teeth of circle saws, might be best understood by considering a detailed description of how it is used to strike off the tip of a single tooth:

Figure 6 shows three views, greatly enlarged, of a tip of a two-man cross-cut saw tooth so struck off. 12 designates a line on which the end of the tooth is first bent away from the edge of the blade to give to the tooth its set. 13 designates a line in the vertical plane of the side of the blade. 14 and 15 indicate the side set away from the edge of the saw before 15 was filed off to get the off-set and parallel surface 18; this filing being done by back-and-forth strokes over the tip on its set side, as indicated at 16 and 17 in Figure 4 and as indicated at 18 in Figures 4 and 7. One by one, the sides of the tips of all shearing teeth set to the same side of the saw are so filed off in alinement. The sides of inserted teeth of circle saws, near the tips, are filed off in alinement in a similar manner.

The teeth on cross-cut saws and rip saws—hands saws, one and two-man saws, band saws and circle saws—may be so alined on their sides.

This file is about four inches long and three-quarters of an inch wide; but these dimensions are susceptible to variation, of course.

The fundamental characteristic of my file is the off-set of the edges of the teeth from the smooth part of the bottom; this arrangement constituting a gauge file, by the use of which even a semi-skilled mechanic can give a perfect alinement to the sides of shearing saw teeth; this off-set being susceptible to varying to suit the sort of saw the file is made for use on.

I claim:

A gauged saw side file, made of tempered steel, comprising a partial loop on its rear end for a fore-finger hold; a bottom surface that is smooth and in a plane parallel to and slightly off-set from the plane of the edges of the filing teeth, this bottom surface having a rounded or beveled edge at its frontal limits to prevent its scarring, on saw tips; teeth on a part of the under surface, the teeth—except on the front end of the file, where the plane of their edges slant upward—being in a plane parallel to and slightly off-set from the plane of the smooth bottom, the degree of this off-set being susceptible to variation to suit the sort of saw the particular style of this file is made for use on; and a depression on the smooth top surface, the depression conforming closely to the contours of the ball of the thumb, to enable the thumb better to press the file against the side of the saw and hold the file in line with the tooth it is filing.

EDGAR C. TUGGLE.